United States Patent [19]

Petersen

[11] Patent Number: 4,731,770

[45] Date of Patent: Mar. 15, 1988

[54] METHOD AND APPARATUS FOR CONTROLLING TRANSDUCER

[75] Inventor: Christian C. Petersen, Cambridge, Mass.

[73] Assignee: Polaroid Corporation, Cambridge, Mass.

[21] Appl. No.: 835,222

[22] Filed: Mar. 3, 1986

[51] Int. Cl.⁴ .............................................. G11B 17/06
[52] U.S. Cl. ...................................... 369/41; 369/215
[58] Field of Search .................. 369/41, 215, 219, 222

[56] References Cited

U.S. PATENT DOCUMENTS

| | | | |
|---|---|---|---|
| 3,503,615 | 3/1970 | Matsuda | 369/41 |
| 4,310,918 | 1/1982 | Hirata | 369/225 |
| 4,437,180 | 3/1984 | Takeuchi | 369/41 |
| 4,437,181 | 3/1984 | Kishima | 369/41 |
| 4,519,059 | 5/1985 | Denis | 369/225 |

Primary Examiner—Steven L. Stephan
Attorney, Agent, or Firm—John S. Vale

[57] ABSTRACT

The present disclosure relates to a method of and apparatus for positioning a read/write head relative to data tracks on recording media. Included is an approach which enhances the linearity of the sensing range by placing the controller transducer intermediate a pivot axis of the heads carrier arm and the head. Also, dual Hall probes are used to provide a self-calibrating feature for the controller.

1 Claim, 2 Drawing Figures

METHOD AND APPARATUS FOR CONTROLLING TRANSDUCER

BACKGROUND OF THE INVENTION

Use of systems for controlling positioning of head assemblies relative to data tracks on recording media disks is well known. Typically, accurate head positioning is difficult to obtain. This is especially so with the advent of disks having higher track density.

It will be appreciated, therefore, that there is a need for a simple, inexpensive, yet reliable controller for precisely positioning a read/write head at preselected locations across data tracks on recording media.

However, many problems present themselves when attempting to achieve such goals. One is interchangeability, that is, data recorded on one drive system must be accurately read by another compatible disk drive system. Often this is difficult because of unintended manufacturing misalignments between different control systems. Given potential misalignment and interchangeability problems, as data density grows, accurate controlling of the head becomes even more essential and difficult.

For inexpensiveness and ease of operation in making and using controllers, it is desirable to use a simple reference signal which has linear characteristics. That is signal strength varies linearly with respect to distance along a sensing path. Typically, linear portions of such reference signals usually have a relatively short length. It is desirable, therefore, to extend the beneficial effects of such linearity in many control situations.

The present invention is intended to overcome the drawbacks mentioned above, as well as provide for improved control over transducer head positioning. Towards this end, the present invention contemplates method and apparatus for improving the control over positioning of a transducer assembly relative to data tracks on recording media.

Provision is made for apparatus which includes means movable about an axis and having mounted thereon a transducer assembly. Driving means is operable to move the movable means about the axis and thereby cause the transducer assembly to travel in overlying relationship across at least a portion of a band of data tracks. Provision is made for means for controlling the driving means and thereby effecting control over positioning of the transducer assembly to preselected positions across the width of the band. The controlling means includes sensing means which is mounted on one of the movable means or a member spaced from the movable means. Also included in the controlling means is means for providing a sensing reference control path. Such a control path has a preselected operational control length. The path is at a location which is at a predetermined ratio of the distance from the axis to the transducer assembly. In this manner, the effective controlled length of movement of the transducer assembly is increased relative to the preselected operational control length by an amount related to the noted ratio.

In an illustrated embodiment, the sensing means includes at least a pair of spaced apart magnetic sensing probes mounted on either the movable means or a member spaced from the movable means. The probes are at selected locations intermediate the axis and the transducer assembly. Magnetic means are provided for establishing a sensing reference path. The path has a preselected control length which is defined by a magnetic field having its strength vary along the extent thereof. The reference path is at a location along the movable means which is at a predetermined ratio of the distance between the axis and the head assembly. In this manner, the effect of the linearity of the control length is increased by an amount related to the ratio.

In such illustrated embodiment, the controlling means includes means operatively coupled to the probes for comparing the magnetic field strength sensed by the probes and determining the relative distance traversed by the head assembly as a function of each of the occurrences of one of the probes reading a value related to a stored value read of the other of the probes. Each occurrence is related to the incremental distance between the probes and thereby the extent of movement of the head assembly along the reference sensing path.

The present invention contemplates a method for achieving the noted transducer positioning.

Among the objects and features of the present invention are, therefore, the provision of an improved apparatus and method for controlling a transducer assembly relative to data tracks on a recording medium; the provision of an apparatus and method which increase the extent of control over positioning of the transducer assembly by a reference control signal having a finite linear length; the provision of an apparatus and method of the character last noted wherein the reference signal and signal sensing means are positioned intermediate a pivot axis for the transducer carrier and the transducer adjacent the distal end of such carrier; the provision of magnetic means for establishing the reference signal by a magnetic field having strength varying substantially linearly along the extent thereof; and the provision of a signal sensing means employing at least a pair of field probes which compare the strength read by one probe against the stored value of a second probe wherein each occurrence of a stored value being read by the one probe indicates traversal of a distance of the transducer which is related to the distance between the probes and thereby the displacement of the transducer assembly.

Other objects and further scope of applicability of the invention will become apparent after reading a detailed description taken in conjunction with the accompanying drawing wherein like reference numerals indicate like structure throughout the several views.

DETAILED DESCRIPTION

Figure 1:
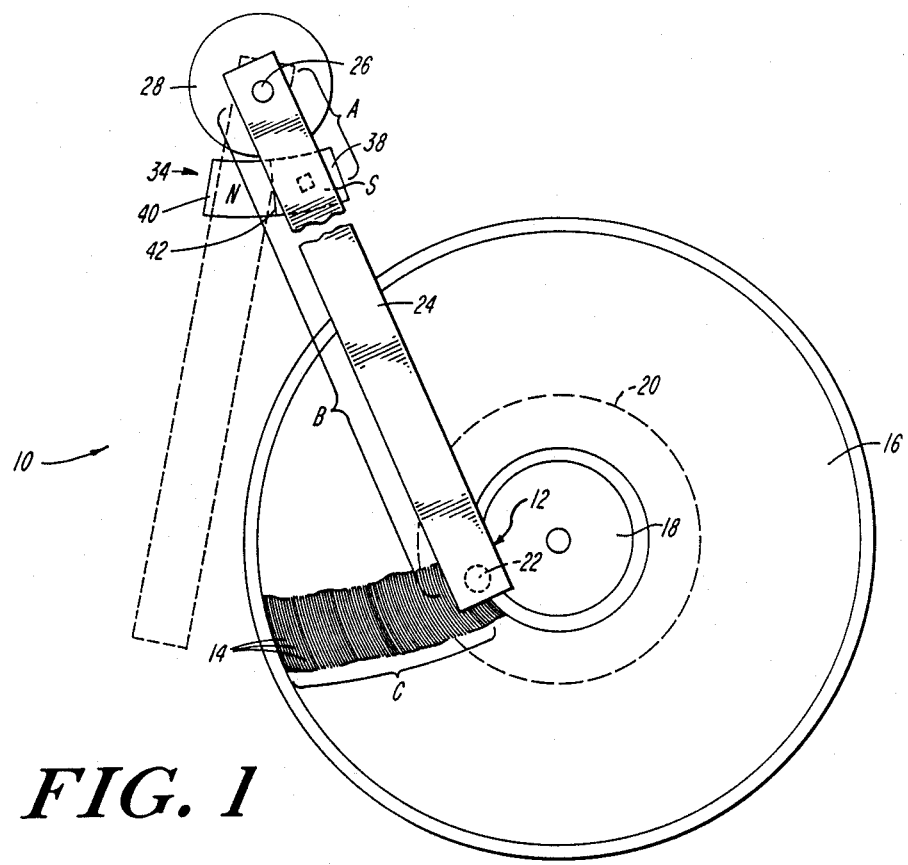
FIG. 1 is a diagrammatic view of a transducer assembly made in accordance with the present invention for use in conjunction with a magnetic recording disk.

FIG. 1 depicts a control apparatus 10 for use in controlling the positioning of a transducer assembly 12 or means relative to data tracks 14 on a magnetic type recording disk 16. The disk 16 is suitably clamped at its hub to a turntable assembly 18. The turntable assembly 18 is part of a disk drive system (not shown). Only those portions of such system which are necessary for an understanding of the invention will be set forth, such as spindle motor 20 which rotatably drives the turntable assembly.

The transducer assembly 12 is mounted in operative relationship to the disk 16 and includes read/write head assembly 22 mounted adjacent the distal end of elongated carrier arm 24. The carrier arm 24 is rotatably driven so that the head assembly 22 traverses a predetermined path C extending in overlying relationship across the circumferential band of data tracks 14. The carrier arm 24 is mounted on a rotatable shaft 26 of a conventional kind of rotary stepper motor 28.

For controlling operation of the stepper motor 28, so that it precisely moves the head assembly 22 to preselected track locations on the disk 16 there is provided a control system 30.

Included in the control system 30 is a sensing and control circuit 32 mounted on the carrier arm 24. Spaced therefrom is a magnetic arrangement 34 used for establishing a reference control signal for controlling the positioning of the read/write head 22. The magnetic arrangement 34 is mounted on a stationary structure 36 which is spaced from the sensing and control circuit 32 by an appropriate distance which allows the latter to read the field strengths of the former.

In particular, the magnetic arrangement 34 has a pair of juxtaposed coplanar permanent magnets 38 and 40 carried by a common surface of the structure 36. Both the permanent magnets 38 and 40 are, preferably, of the rare earth type, such as samarium cobalt. The permanent magnets 38 and 40 are thin, flat and have a generally curved configuration (FIG. 1). Both the magnets 38 and 40 abut each other along a common structure 42, have opposite polarity to the other and equal strengths. For illustration purposes, the upper exposed surface of the permanent magnet 38 has a south polar S magnetization, while the exposed surface of the permanent magnet 40 has a north polar N magnetization. The fields of these magnets 38 and 40 extend in a direction which is generally perpendicular to the given path of the read/write assembly 22. It has been determined the magnetic arrangement 34 establishes a substantially linear field strength to distance relationship such as described in commonly assigned and copending application Ser. No. 433,468 filed Oct. 12, 1982. Such linearity is useful for purposes of establishing a field profile which is relatively easy to use. Nevertheless, it should be pointed out that the field strength profile established by the magnets can vary, such as in the manner described in commonly assigned and copending application Ser. No. 454,045 filed Dec. 27, 1982. Other types of field profiles are usable within the broad scope of this invention.

Reference is now made to a magnetic sensing and control circuit 32. In this embodiment, it can be embodied in a single integrated circuit (IC) chip. Details regarding structure and operation of the magnetic sensing and control circuit 32 do not, per se, form an aspect of the present invention. Therefore, only those details necessary for an understanding thereof will be set forth. For a more complete understanding, reference is made to the last-noted copending application.

Advantageously, use of a chip in the foregoing arrangement facilitates construction of a highly miniaturized controller. For ease in describing the sensing and control circuit 32, it is shown in block diagram form. Included is a pair of Hall probes 44 or transducers which depend from the carrier arm 24. As so positioned, the Hall probes 44 cut the fields of the magnets 38, 40 to produce output signals while the carrier arm 24 is rotatably driven by the stepper motor 28 to traverse the disk 16. It will be understood that the Hall probes 44 are mounted so that they are cut by generally perpendicular lines of flux to the plane of control current flowing therethrough. The Hall probes 44 are operated on a constant DC current source and the resulting Hall voltages or output signals provided by the probes are directly proportional to the magnetic field strengths of magnets 38 and 40 which are perpendicular thereto.

The integrated circuit chip includes a control circuit 46 having a microprocessor (MPU) which is responsive to a plurality of inputs. One input is a track address or x-increment command signal. Such a command signal could be responsive to a control system (not shown) and be representative of, for example, the distance it is desired to move the read/write head assembly 22 to a desired track address. Other inputs to the microprocessor would include the Hall voltages read by each of the Hall probes 44. The microprocessor (MPU) includes a buffer device (not shown) for storing and feeding the previously noted inputs in appropriately encoded form so that it interacts with a read only memory (ROM). The ROM stores a program defining the microprocessor's operating instructions and a program which will manipulate the inputs from the buffer device. In this embodiment the control circuit will, among other things, determine a number of measuring cycles based on the track address command signal, which is representative of the distance the head assembly 22 is to move. Each measuring cycle is determined by the time it takes one of the probes 44 to move a distance corresponding to the predetermined incremental spacing between the probes 44. The total number of cycles is determined by the track address command signal.

In each cycle, the field strengths of both probes 44 are read. The value of the probe which is leading in the rotational direction of carrier arm travel is stored. Each measuring cycle will continue until the trailing probe signal matches the voltage value corresponding to the track address signal. When this occurs, a null condition arises which is effective to control the circuit so that current to the stepper motor 28 is reduced to a stand-by level. Hence the stepper motor 28 will no longer drive the carrier arm 24 and the head assembly 22 will be at the desired position.

For purposes of illustration, let us assume it is desired to move the carrier arm 24 to a particular track address. Such an address is at some desired location along the width of the data tracks 14 on the disk 16. The track address signal is related to the incremental distance it is desired to have the carrier arm 24 and thereby the head assembly 22 travel from the rest position. The track address signal is the x-increment command signal and causes the sensing and control circuit 32 to, among other things, actuate the stepper motor control circuit 48. Operation of the stepper motor control circuit 48 effects energization of the stepper motor 28 for driving the carrier arm 24 in a manner noted previously.

Figure 2:
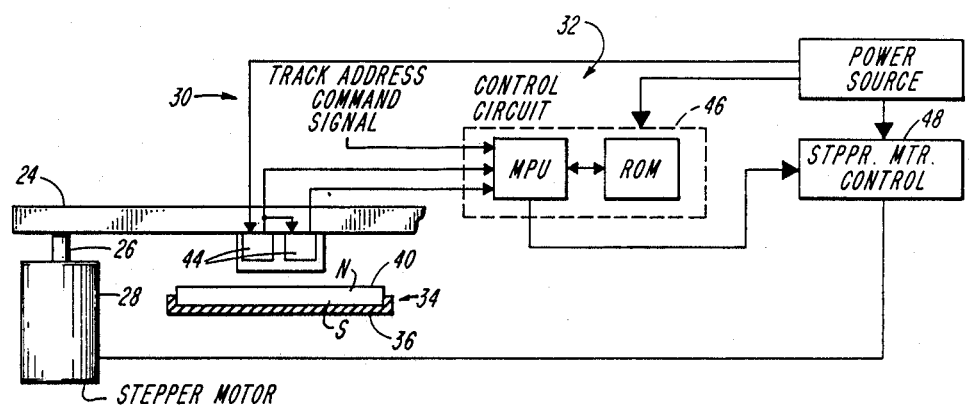
FIG. 2 is a diagrammatic view showing the transducer in a different position and a controlling circuit for use in controlling positioning of the transducer assembly.

As described in the last noted application the head assembly 22 may be accurately indexed. This is true virtually regardless of the resultant field profile that might exist between different disk drive systems. Importantly, variations, such as gap or field strength, that might exist in different drive systems and which would otherwise lead to different voltage readings by the probes are not problems in the present embodiment. This is because the probes are spaced apart by a fixed distance and need not measure the same voltage values in order to be assured that they are travelling the desired distance. In this regard, as noted, the leading probe stores an appropriate field strength value for future comparison and computational purposes with the value of the trailing probe. Thus, for each time the trailing probe reads the value of the leading probe the carrier arm has travelled a distance equal to the distance between the probes. It should be noted that the probes 44 are for purposes of illustration shown in FIG. 2 in side-by-side relationship. While, the probes 44 should be positioned side-by-side, they should be positioned one behind the other in FIG. 2.

It will be appreciated then that the sensing and control circuit arrangement 32 is extremely versatile and reliable. It also automatically compensates for variations that exist between different drive systems.

As pointed out earlier, it will be appreciated that the rotational degree of movement of the carrier arm 24 which permits the probes 44 to remain in the general linear portion of the field is rather limited. Significantly, because the control mechanism is disposed intermediate the length of the carrier arm 24, it increases the linearity response of the reference signal provided by the magnets 38, 40. The closer the sensing circuit 32 and magnetic arrangement 34 to the rotational axis, the greater the distance the head assembly 22 can be controlled by the linear portion of the reference signal.

The extent of such extension in linearity is a function of the ratio of the distance A the magnetic reference signal is to the rotational axis as compared to the distance B the head assembly 22 is to the same rotational axis. It will be appreciated the closer the magnetic arrangement 34 is to the rotational axis, the greater the extent the head assembly 22 can be controlled by the linear portion of the reference field signal. Conversely, the farther the magnetic arrangement 34 is from the rotational axis the relatively less the extent the head assembly 22 can be controlled by the linear portion of the reference signal. Hence, the foregoing relationships allow the use of relatively inexpensive more compact controller for extending control over the head assembly.

For purposes of illustration, if the extent of linearity of the reference signal is 0.015" and the ratio of A/B is $\frac{1}{3}$ then the same reference signal can control a distance of 0.045" as opposed to 0.015". This is a significant increase. Of course, other ratios yield different degrees of extension of the linear control.

This invention is also versatile enough so that it could, for example, be used in control systems wherein the read/write head assembly initially reads a start reference track signal on the disk 16 and is then moved from such a reference track to the desired track instead of moving from some other start position.

What is claimed is:

1. Apparatus for controlling the position of a transducer mounted for movement across data tracks on a recording medium, said apparatus comprising:

a transducer mounting assembly including an elongated arm supporting a transducer near one end thereof and being mounted for rotation about an axis near the opposite end of said arm, said assembly being positioned so that said transducer is movable across the data tracks, in operative overlying relation thereto, in response to rotation of said arm;

drive means operable for rotatably driving said arm about said axis; and control means for controlling the position of said transducer with respect to selected data tracks, said control means including;

(a) a pair of magnetic sensing probes mounted on said arm, near said other end, for rotation with said arm over a sensing path, said probes being spaced with respect to each other in leading and lagging relation in the direction of arm rotation;

(b) magnetic means for defining a magnetic field having a field strength that varies linearly over said sensing path in the path of travel of said probes so that said probes provide signals indicative of the relative positions of said probes along said sensing path;

(c) means for providing a track address signal indicative of a selected data track;

(d) signal processing means for receiving said track address signal and said probe signals and deriving therefrom a control signal for operating said drive means to effect arm rotation so said transducer is positioned over the selected track.

* * * * *